US008724664B2

(12) United States Patent
Stapleton et al.

(10) Patent No.: US 8,724,664 B2
(45) Date of Patent: May 13, 2014

(54) SOFTWARE CONFIGURABLE DISTRIBUTED ANTENNA SYSTEM AND METHOD FOR BANDWIDTH COMPRESSION AND TRANSPORT OF SIGNALS IN NONCONTIGUOUS FREQUENCY BLOCKS

(71) Applicant: Dali Systems Co. Ltd., Grand Cayman (KY)

(72) Inventors: Shawn Patrick Stapleton, Burnaby (CA); Wan-Jong Kim, Port Moody (CA)

(73) Assignee: Dali Systems Co. Ltd, George Town (KY)

( * ) Notice: Subject to any disclaimer, the term of this patent is extended or adjusted under 35 U.S.C. 154(b) by 0 days.

(21) Appl. No.: 13/686,036

(22) Filed: Nov. 27, 2012

(65) Prior Publication Data
US 2014/0010168 A1 Jan. 9, 2014

Related U.S. Application Data

(60) Provisional application No. 61/564,211, filed on Nov. 28, 2011.

(51) Int. Cl.
*H04J 3/04* (2006.01)
(52) U.S. Cl.
USPC ............................................ 370/533; 370/534
(58) Field of Classification Search
USPC .................................................. 370/533, 534
See application file for complete search history.

(56) References Cited

U.S. PATENT DOCUMENTS

| 6,307,877 | B1* | 10/2001 | Philips et al. ................. 375/130 |
| 8,260,143 | B2* | 9/2012 | Gupta et al. .................. 398/115 |
| 2002/0067757 | A1 | 6/2002 | Philips et al. |
| 2004/0106387 | A1 | 6/2004 | Bauman et al. |
| 2004/0132474 | A1 | 7/2004 | Wala |
| 2007/0086544 | A1 | 4/2007 | Fudge et al. |
| 2008/0181282 | A1 | 7/2008 | Wala et al. |

OTHER PUBLICATIONS

Notification of Transmittal of the International Search Report and the Written Opinion of the International Searching Authority, or the Declaration; International Search Report and Written Opinion of the International Searching Authority for corresponding International application No. PCT/US2012/066671 mailed on Mar. 22, 2013, 9 pages.

* cited by examiner

*Primary Examiner* — Brenda H Pham
(74) *Attorney, Agent, or Firm* — Kilpatrick Townsend & Stockton LLP

(57) ABSTRACT

A method for transporting communications signals includes receiving an analog IF signal at a first unit. The analog IF signal includes a first carrier having a first frequency and a first bandwidth and a second carrier having a second frequency different from the first frequency and a second bandwidth. The analog IF signal is converted to a digitally sampled IF signal having the first carrier located in a first Nyquist zone, the second carrier located in a second Nyquist zone, an image of the first carrier located in a third Nyquist zone, and an image of the second carrier located in the third Nyquist zone. The image of the first carrier and the image of the second carrier is transmitted from the first unit to a second unit, where the image of the first carrier and the image of the second carrier is then converted to the analog IF signal.

14 Claims, 9 Drawing Sheets

SOFTWARE CONFIGURABLE DISTRIBUTED ANTENNA SYSTEM AND METHOD FOR BANDWIDTH COMPRESSION AND TRANSPORT OF SIGNALS IN NONCONTIGUOUS FREQUENCY BLOCKS

CROSS-REFERENCES TO RELATED APPLICATIONS

This application claims priority to U.S. Provisional Patent Application No. 61/564,211, filed on Nov. 28, 2011, titled "Software Configurable Distributed Antenna System and Method for Bandwidth Compression and Transport of Signals in Noncontiguous Frequency Blocks," the disclosure of which is hereby incorporated by reference in its entirety for all purposes.

BACKGROUND OF THE INVENTION

Wireless communication systems employing Distributed Antenna Systems (DAS) are available. A DAS typically includes one or more host units, optical fiber cable or other suitable transport infrastructure, and multiple remote antenna units. A radio base station is often employed at the host unit location commonly known as a base station hotel, and the DAS provides a means for distribution of the base station's downlink and uplink signals among multiple remote antenna units. The DAS architecture with routing of signals to and from remote antenna units can be either fixed or reconfigurable. Sometimes a bi-directional amplifier or RF repeater is used instead of an on-site base station to feed downlink over-the-air signals from a nearby base station to the DAS, and to feed uplink signals from the DAS over-the-air to a nearby base station.

A DAS is advantageous from a signal strength and throughput perspective because its remote antenna units are physically close to wireless subscribers. The benefits of a DAS include reducing average downlink transmit power and reducing average uplink transmit power, as well as enhancing quality of service and data throughput.

Despite the progress made in wireless communications systems, a need exists for improved methods and systems related to wireless communications.

SUMMARY OF THE INVENTION

The present invention relates to transporting RF signals in noncontiguous frequency blocks within a DAS. More specifically, the present invention relates to a DAS for which the routing and splitting functions of downlink signals within the DAS and the routing and combining functions of uplink signals within the DAS are reconfigurable based on software configurable subsystems deployed at the host unit or host units and/or at the remote antenna units.

A DAS includes one or more Digital Remote Units (DRUs) and one or more Digital Access Units (DAUs). The DAU typically interfaces to a Base Station and the DRU is remotely located in the desired coverage area. The DRU receives the uplink signals from the mobile terminals and transports them to the DAU. The transport medium between the DAU and DRU may be Optical Fiber, Coaxial Cable, twisted pair cable, Microwave Link, or other transport media. In order to efficiently transport RF signals that are not spaced compactly, i.e., immediately adjacent to one another in the frequency domain, signal processing techniques may be used to reduce the data rate associated with transport of the signals.

Some DAS applications involve the transport of multiple Wireless operator frequency bands over the transport medium. In the case of an optical fiber transport medium, the transport data rate is a critical parameter that affects the cost and performance of the system. The transport data rate is controlled by the operator's assigned RF bandwidth and dynamic range of the signals to be transported. In the case of a Neutral Host DAS, the total RF bandwidth corresponds to the combined RF bandwidth of multiple operators. DAS systems that transport multiple operator bands will typically accommodate the aggregate RF bandwidth resulting from each operator's frequency bands.

Applications arise where the RF bandwidth may not be fully utilized and only a few radio frequency carriers are positioned within the entire bandwidth. This system is classified as having signals in noncontiguous frequency blocks. A conventional approach would be to transport the entire bandwidth from the DRU to the DAU. However, this would be a very inefficient use of the optical transport data rate. A more efficient approach would be to channelize or filter the active bandwidth segments and transport only the information carried in the active bandwidth segments. Although this approach would reduce the effective optical transport data rate, the addition of the channelized filters increases the system delay and complexity.

Another approach to more efficiently transport the RF signals is by employing digital signal processing. The RF bandwidth associated with the RF signals is assumed to contain two or more carriers positioned within the RF bandwidth. The uplink RF signals at the DRU may be translated to an IF frequency before they are fed into an Analog to Digital Converter (ADC). By properly selecting the sampling rate of the ADC with respect to the IF frequency, the carriers' respective positions are defined so that the resulting images fall within different Nyquist zones. This approach causes the respective carriers' images to fold into the same Nyquist zone. The net effect is to transform the carriers in noncontiguous frequency blocks into a more compact bandwidth (i.e., compressed bandwidth) for transport over the optical fiber. The overall result is a significantly reduced optical transport data rate usage for transporting these carriers, while maintaining the appropriate value of dynamic range.

The bandwidth-compressed uplink signal is transported from the DRU to one or more DAUs. The DAU performs an inverse transformation in order to reconstruct the uplink signal including the individual carriers at their original locations within the original bandwidth of operation. The DAU then feeds the uplink signals to the uplink port of the Base Station.

The bandwidth compression technique of the present invention can also be used for processing the downlink signal. Downlink refers to the transport of the RF signal from the Base Station to the DAU, then optically transporting it to one or more DRUs.

Wireless and mobile network operators face the continuing challenge of building networks that effectively manages high data traffic growth rates. Wireless and mobile technology standards are evolving towards higher bandwidth needed for high peak data rates and cell throughput growth.

Conventional radio base stations employed in wireless networks utilize various 2 G, 2.5 G, 3 G and 4 G radio technologies (such as CDMA, CDMA 1xEV-DO, WCDMA, WiMAX, LTE, etc.).

The present invention substantially overcomes the limitations of conventional DAS solutions employing transport technologies with bandwidth limitations. The bandwidth limitations seen with the transport technology typically result from transport data rate performance tradeoffs due to component and subsystem costs. Leading cost drivers include optical transceivers and DSP processors. Accordingly, it is an object of the present invention to provide a high performance, cost-effective, dynamically reconfigurable DAS system, architecture and method which offers a bandwidth compression technique for reducing the optical data transport rate in the system.

Embodiments of the present invention employ a bandwidth compression technique via signal processing to reduce the total bandwidth needed for transporting carriers in noncontiguous frequency blocks. The technique uses the images that result from sampling the carriers when the carriers are placed in different Nyquist zones. The technique is applicable to systems that utilize multiple carriers. This technique is also applicable when some of the carriers reside in the same Nyquist zones.

This technique provides features to enhance the cost-effectiveness, flexibility and system performance for applications where multiple remote antenna units are deployed. Systems that are employed in the present invention, include one or more Digital Access Units (DAUs), a Remote Radio Head Unit (RRU), and/or one or more Digital Remote Units (DRUs).

The present disclosure describes embodiments to provide performance enhancements for a DAS including one or more DAUs, optical fiber transport, and one or more RRUs.

The present invention relates to methods and systems that employ a bandwidth compression technique via signal processing to reduce the total bandwidth needed for transporting carriers in noncontiguous frequency blocks. In an embodiment, the technique uses the images that result from sampling the carriers when the carriers are placed in different Nyquist zones. The technique is applicable to systems that utilize multiple carriers. This technique is also applicable when some of the carriers reside in the same Nyquist zones.

In some embodiments, a method is presented for transporting communications signals. The method may include receiving an analog IF signal at a first unit, wherein the analog IF signal includes a first carrier having a first frequency and a first bandwidth and a second carrier having a second frequency different from the first frequency and a second bandwidth. A sampling signal having a sampling frequency may be provided. The analog IF signal may then be converted to a digitally sampled IF signal, wherein the digitally sampled IF signal includes: the first carrier located in a first Nyquist zone, the second carrier located in a second Nyquist zone, an image of the first carrier located in a third Nyquist zone, and an image of the second carrier located in the third Nyquist zone. The third Nyquist zone may be at a lower frequency bandwidth than the first and second Nyquist zones, and in general the first, second, and third Nyquist zones may be in any order of frequency bandwidths relative to each other. The image of the first carrier and the image of the second carrier may be transmitted from the first unit to a second unit. The image of the first carrier and the image of the second carrier may be received at the second unit. A second sampling signal have a second sampling frequency may then be provided, and the image of the first carrier and the image of the second carrier may be converted to the analog IF signal.

In some embodiments, the first unit comprises a DRU and the second unit comprises a DAU. In some embodiments, the first unit comprises a DAU and the second unit comprises a DRU. In some embodiments, the digitally sampled IF signal is filtered to remove unneeded samples and reflections of signals. In some embodiments, the step of transmitting the image from the first unit to a second unit may be performed using an Ethernet cable, an optical cable, a microwave link, a coaxial connection, or a wireless link. In some embodiments, the step of transmitting the image from the first unit to the second unit may be using a parallel connector independent of a SERDES.

In some embodiments, a system or apparatus may be presented, the system or apparatus be operable to perform any of the methods described herein. The system or apparatus may include a first unit having an input port, and an A/D converter coupled to the input port. The system or apparatus may include second unit including a D/A converter, and a transmission link coupling the first unit and the second unit, wherein the transmission link. The input port, A/D converter, D/A converter and transmission link may be operable to perform the steps of any of the methods described herein.

BRIEF DESCRIPTION OF THE DRAWINGS

Further objects and advantages of the invention can be more fully understood from the following detailed description taken in conjunction with the accompanying drawings.

DETAILED DESCRIPTION OF THE INVENTION

According to embodiments of the present invention, a novel Distributed Antenna System (DAS) that exploits the Software Configurable Radio subsystem (referred to hereinafter as software defined radios or a software-defined digital platform) is provided. Embodiments enable DAUs, RRUs, and DRUs to communicate with each other.

Moreover, the system is flexible with regard to being able to support various radio technologies, such as CDMA, CDMA 1xEV-DO, TD-SCDMA, WCDMA and LTE. However, embodiments may not be limited to these, as other applicable radio technologies may be apparent to those with ordinary skill in the art.

Figure 1:
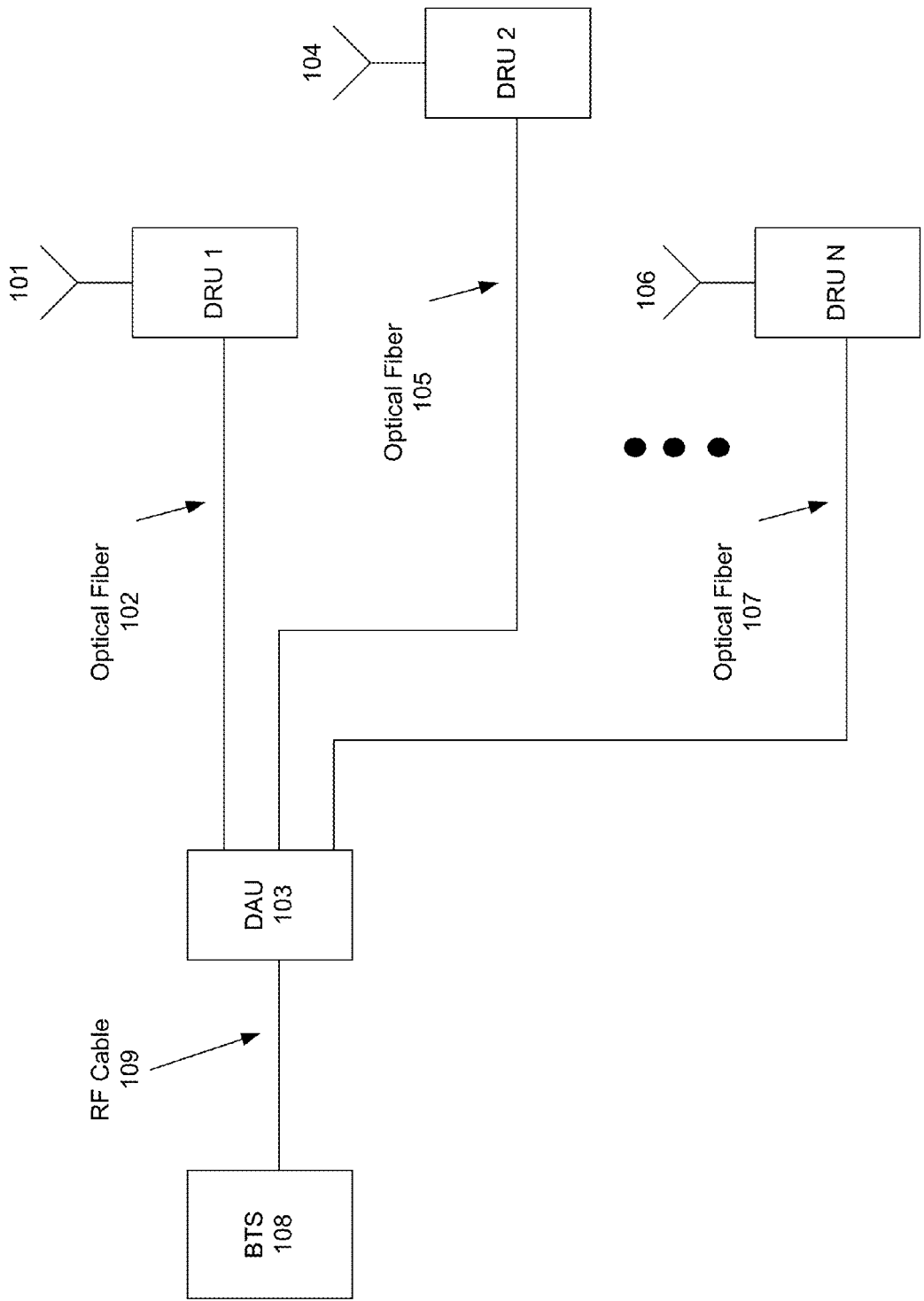
FIG. 1 shows an example of a DAS architecture, highlighting the interfaces between a Base Station (BTS), a Digital Access Unit (DAU) and multiple Digital Remote Units (DRUs).

FIG. 1 shows a block diagram of an exemplary Distributed Antenna System (DAS). Each DRU may receive wireless uplink signals 101, 104, or 106 at its antenna. The DRUs may each be connected to a DAU 103 via an optical fiber 102, 105 or 107, and the DAU 103 may be connected to a BTS 108 via one or more RF cables 109. The DRU may transport the uplink signals to the DAU via the optical fibers. The DAU 103 may receive wireless downlink signals from the BTS 108. The DAU 103 may transport downlink signals, not shown, to each of the DRUs via the optical fibers 102, 105, or 107. The DAU 103 and the DRUs may each contain a software-defined digital platform.

Still referring to FIG. 1, DRU 1 receives wireless uplink signals 101, represents the signals 101 in a digital format and transports them via optical fiber 102 to DAU 103. Similarly, DRU 2 receives wireless uplink signals 104, represents the signals 104 in a digital format and transports them via optical fiber 105 to DAU 103. Similarly, DRU N receives wireless uplink signals 106, represents the signals in a digital format and transports them via optical fiber 107 to DAU 103. DAU 103 processes all the incoming optical signals containing the respective uplink signals, according to the settings entered within the software-defined digital platform within the DAU 103. DAU 103 then converts the appropriate uplink signals to RF and routes the appropriate RF uplink signals to BTS 108 via RF Cable 109.

An alternative embodiment may be described as follows. Instead of feeding one DRU with one optical fiber, the DRU may in turn feed a second DRU in a daisy-chain configuration, meaning the DRUs may be linked in a sequence with each other, via optical fiber or similar communication means. An additional embodiment is one where multiple optical fibers may be used to interconnect the DAU with a single DRU, in order to deliver additional capacity to the DRU.

A further alternative embodiment may be described as follows. Instead of having only one DAU in the system, two or more DAUs may be daisy-chained or networked in order to provide a capability for digital combining of signals from multiple base stations which in turn feed the various DRUs. For this embodiment, the base stations may either be on different frequencies in different bands, on different frequencies within the same band, or on the same frequencies in the same band. The latter embodiment relates to an application for capacity enhancement at a specific DRU where it is advisable to avoid sharing of radio resources among multiple DRUs. In that case, multiple co-channel base stations would typically be connected to the DAUs.

An alternative embodiment may be described as follows. Instead of using an optical fiber link to transport signals from the DAU to DRU 1 as in FIG. 1, a point-to-point microwave link may be used for transporting the signals in both directions. Also, instead of using an optical fiber link to transport signals from the DAU to DRU 1, a wire cable such as unshielded twisted pair may be used for transporting the signals in both directions.

A further alternative embodiment may be described as follows. Instead of using an RF cable to connect signals between the BTS and DAU, an RF repeater can be used to transport RF signals over-the-air between a nearby base station site and the DAU.

Another alternative embodiment may be described as follows. Instead of using a DAU 103 to interact between DRUs and a BTS 108, each DRU may be connected to the base station 108 without a DAU 103. This configuration may be sometimes called a remote radio head, and the DRUs may be called RRUs in this case. Persons skilled in the art would appreciate other embodiments of the present invention based on similar DAS architectures as described herein, either singly or in combination.

Figure 2:
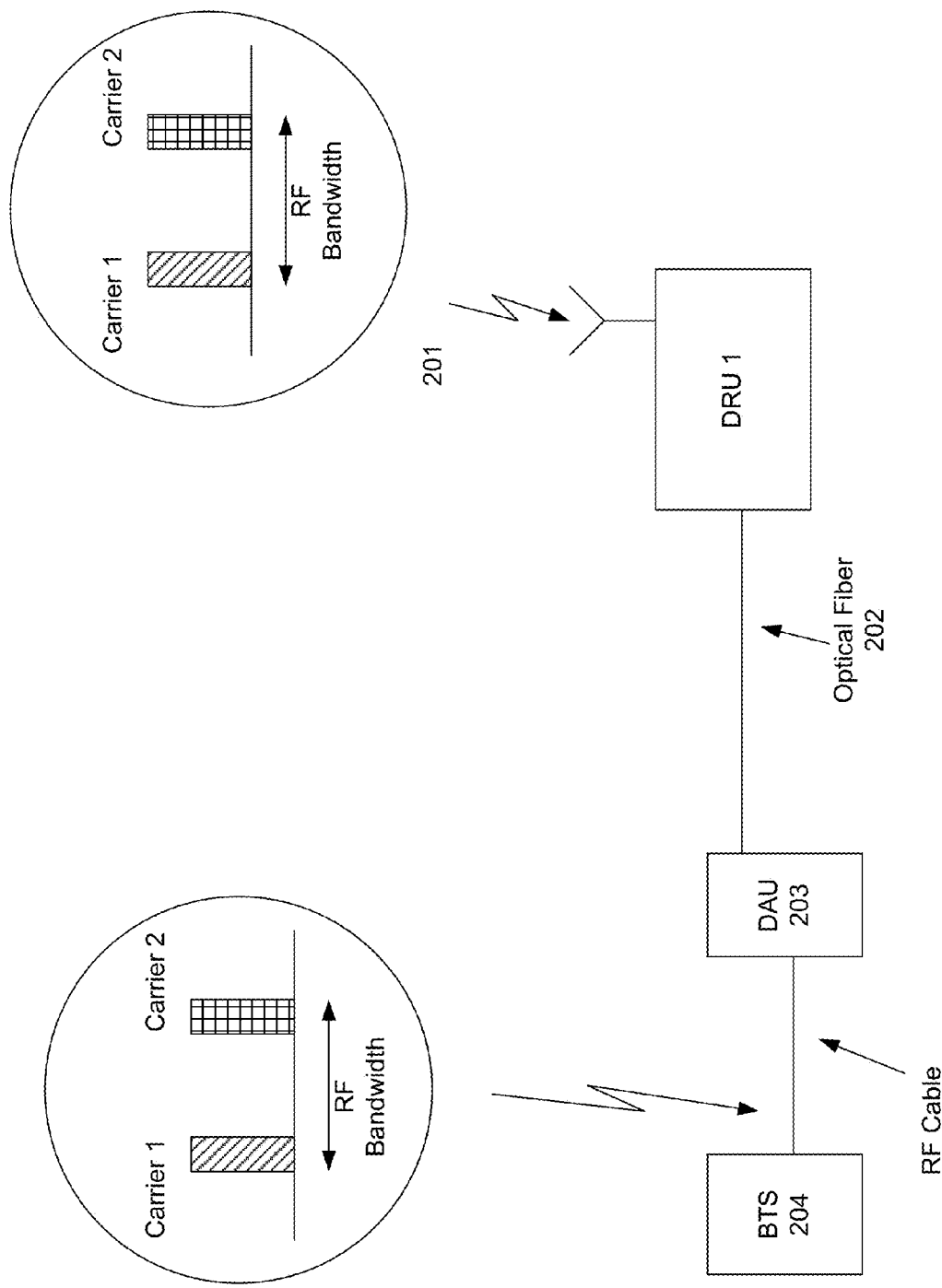
FIG. 2 illustrates the transport of a wireless uplink signal from the DRU to the base station. The wireless uplink signal is represented as two carriers in noncontiguous frequency blocks.

FIG. 2 illustrates the transport of a wireless uplink signal from the DRU to the base station. The wireless uplink signal is represented as two carriers in noncontiguous frequency blocks. Referring to FIG. 2, DRU 1 receives wireless uplink signals 201, represents the signals in a digital format and transports them via optical fiber 202 to DAU 203. DAU 203 then converts the appropriate uplink signals to RF and routes the appropriate RF uplink signals to BTS 204.

An example of two carriers in noncontiguous frequency blocks is as follows, with reference to FIG. 2. Carrier 1 may be a 5 MHz wide WCDMA carrier, Carrier 2 may be a 5 MHz wide CDMA carrier and there may be a 15 MHz wide gap between the 2 carriers, the total bandwidth occupied by the two carriers and including the gap is 25 MHz. With regard to FIG. 2, the optical fiber transport function allocates at least 25 MHz to the uplink signal. It would be highly desirable to employ a bandwidth compression technique to reduce the allocated bandwidth for the optical fiber transport function.

Figure 3:
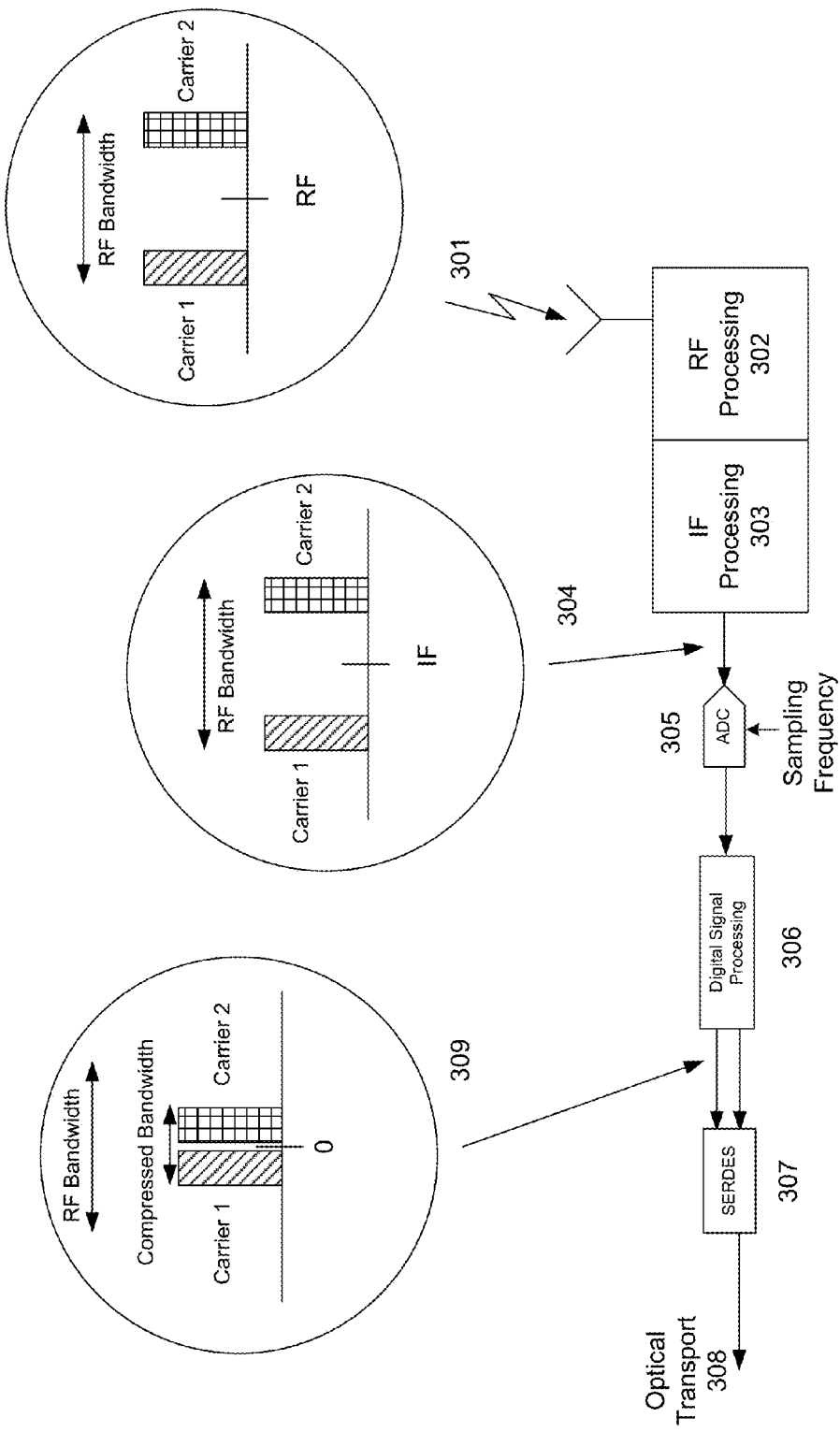
FIG. 3 shows an embodiment illustrating the uplink signal bandwidth compression technique of the present invention, which is employed within the DRU.

FIG. 3 shows an embodiment illustrating the uplink signal bandwidth compression technique of the present invention, which is employed within the DRU. Referring to FIG. 3, the uplink input signal 301 comprising two wireless carriers is frequency translated by RF Processing Function 302 and IF Processing Function 303 to an Intermediate Frequency (IF). The IF signal 304 is then sampled by ADC 305 at a rate which causes the images of the two uplink carriers to be positioned within separate Nyquist zones. In general a Nyquist zone as used herein may refer to the standard definition of Nyquist zone as used and understood according to those with ordinary skill in the art, e.g. each zone represents a sampling of the signal in question where the sampling rate is no slower than 2B (the Nyquist rate), where B is the highest frequency of the signal in question. As is seen in FIG. 3, the images fold into the same Nyquist zone so as to create a compact compressed bandwidth.

The Digital signal processing function 306 helps prepare the signals for transport over the optical fiber. The Serializer/Deserializer (SERDES) 307 translates the parallel bit streams into serial bit streams, and the resulting serial bit stream corresponding to signal 309 is fed to the Optical Transport function 308.

It is readily understood that although FIG. 3 describes the uplink signal as comprising two carriers, various embodiments of the present invention may include two or more noncontiguous bandwidths.

Figure 4:
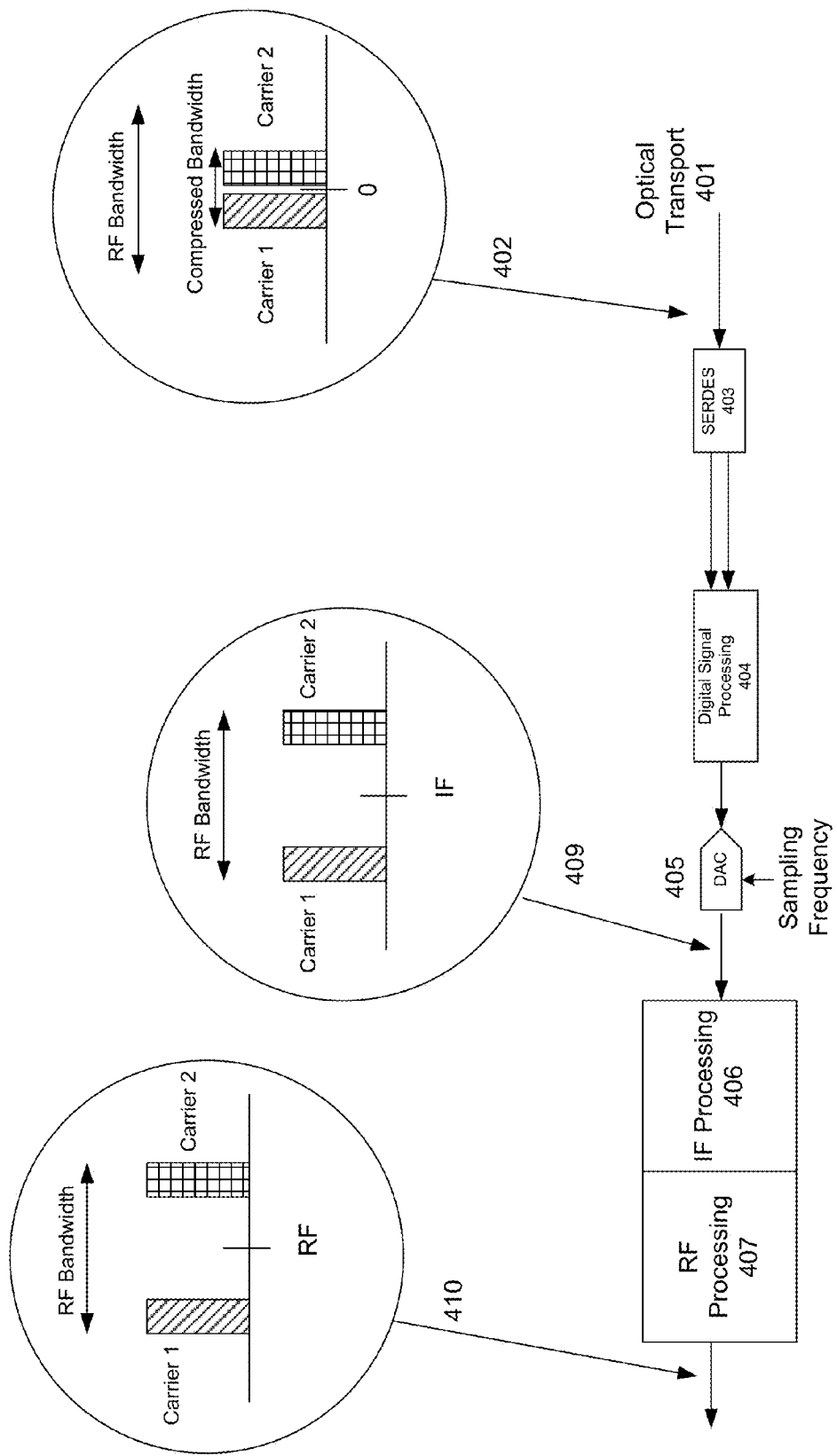
FIG. 4 shows an embodiment illustrating the reconstruction of the uplink signal using the bandwidth decompression technique of the present invention, which is employed within the DAU.

FIG. 4 shows an embodiment illustrating the reconstruction of the uplink signal using the bandwidth decompression technique of the present invention, which is employed within the DAU. The compressed bandwidth is reconstructed back to its original form and the resulting signal is fed into the base station. Referring to FIG. 4, the serial bit stream 402 is fed from the Optical Transport function 401 into the Serializer/Deserializer (SERDES) 403 which translates the serial bit stream into parallel bit streams. The parallel bit streams are fed into the Digital Signal Processing function 404 which prepares the signals to be processed by DAC 405, which samples the resulting signal at a rate such that the signals are reconstructed and returned to their appropriate positions in the IF domain (Signal 409) as seen in FIG. 4. The IF Processing function 406 and the RF Processing function 407 translate the IF signal back to the RF domain, and the resulting signal 410 is fed to the BTS 408.

Figure 5:
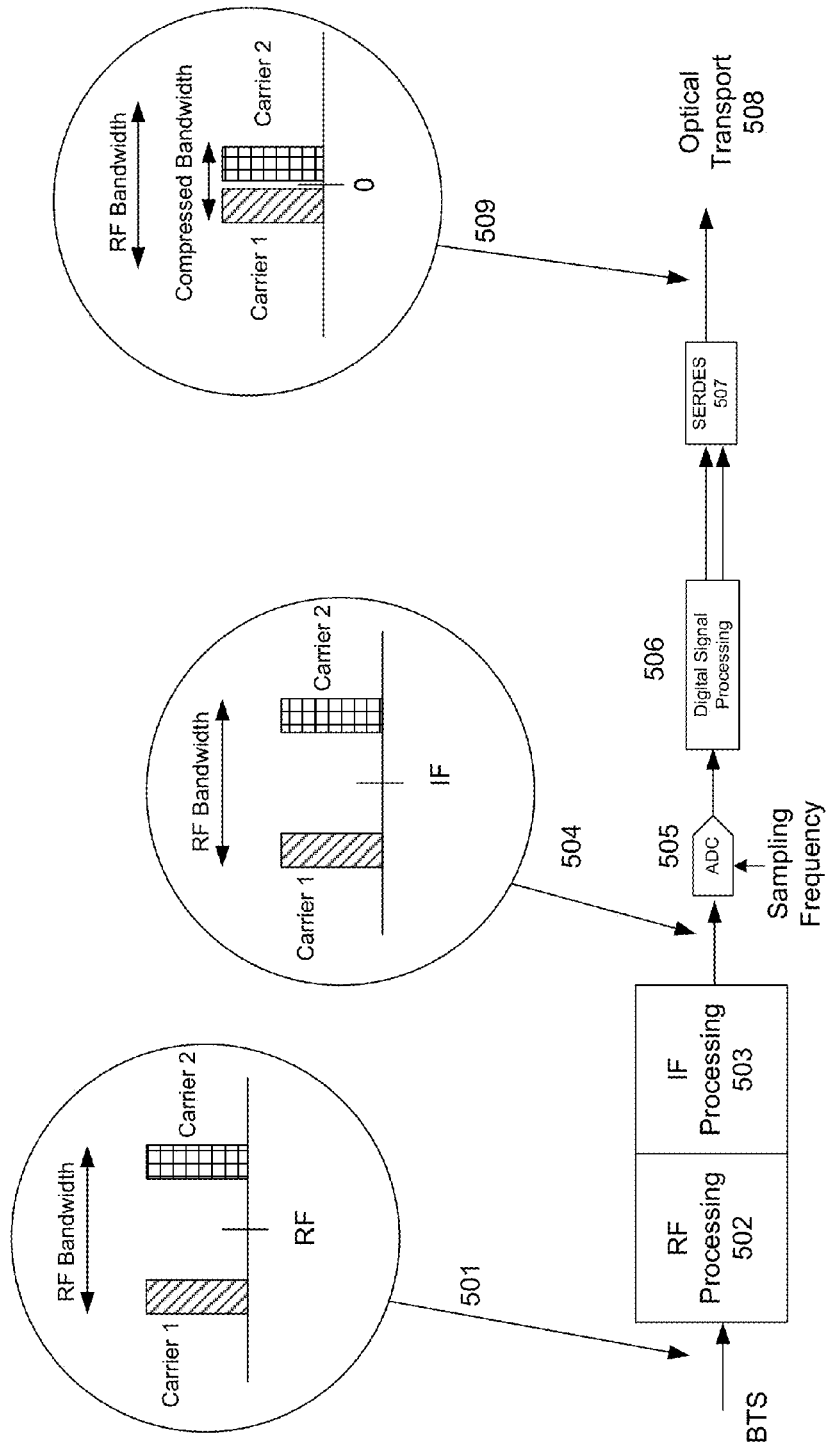
FIG. 5 shows an embodiment illustrating the downlink signal bandwidth compression technique of the present invention, which is employed within the DAU.

FIG. 5 shows an embodiment illustrating the downlink signal bandwidth compression technique of the present invention, which is employed within the DAU. The DAU contains the functions which process the downlink signal in preparation for transport over the optical fiber to one or more DRUs. Referring to FIG. 5, the downlink input signal 501 comprising two wireless carriers is frequency translated by RF Processing Function 502 and IF Processing Function 503 to an Intermediate Frequency (IF). The IF signal 504 is then sampled by ADC 505 at a rate which causes the images of the two downlink carriers to be positioned within separate Nyquist zones. As is seen in FIG. 5, the images fold into the same Nyquist zone so as to create a compact compressed bandwidth. The Digital signal processing function 506 helps prepare the signals for transport over the optical fiber. The Serializer/Deserializer (SERDES) 507 translates the parallel bit streams into serial bit streams, and the resulting serial bit stream corresponding to Signal 509 is fed to the Optical Transport function 508.

It is readily understood that although FIG. 5 describes the downlink signal as comprising two carriers, the embodiment would apply as well to two or more noncontiguous bandwidths.

It is readily understood that although FIG. 5 may be discussed in references to the use of a single RF-to-IF frequency translator for both of the two downlink carriers, embodiments would apply as well in the event that multiple RF-to-IF frequency translators were used along with an IF summing function whose output feeds the ADC.

Figure 6:
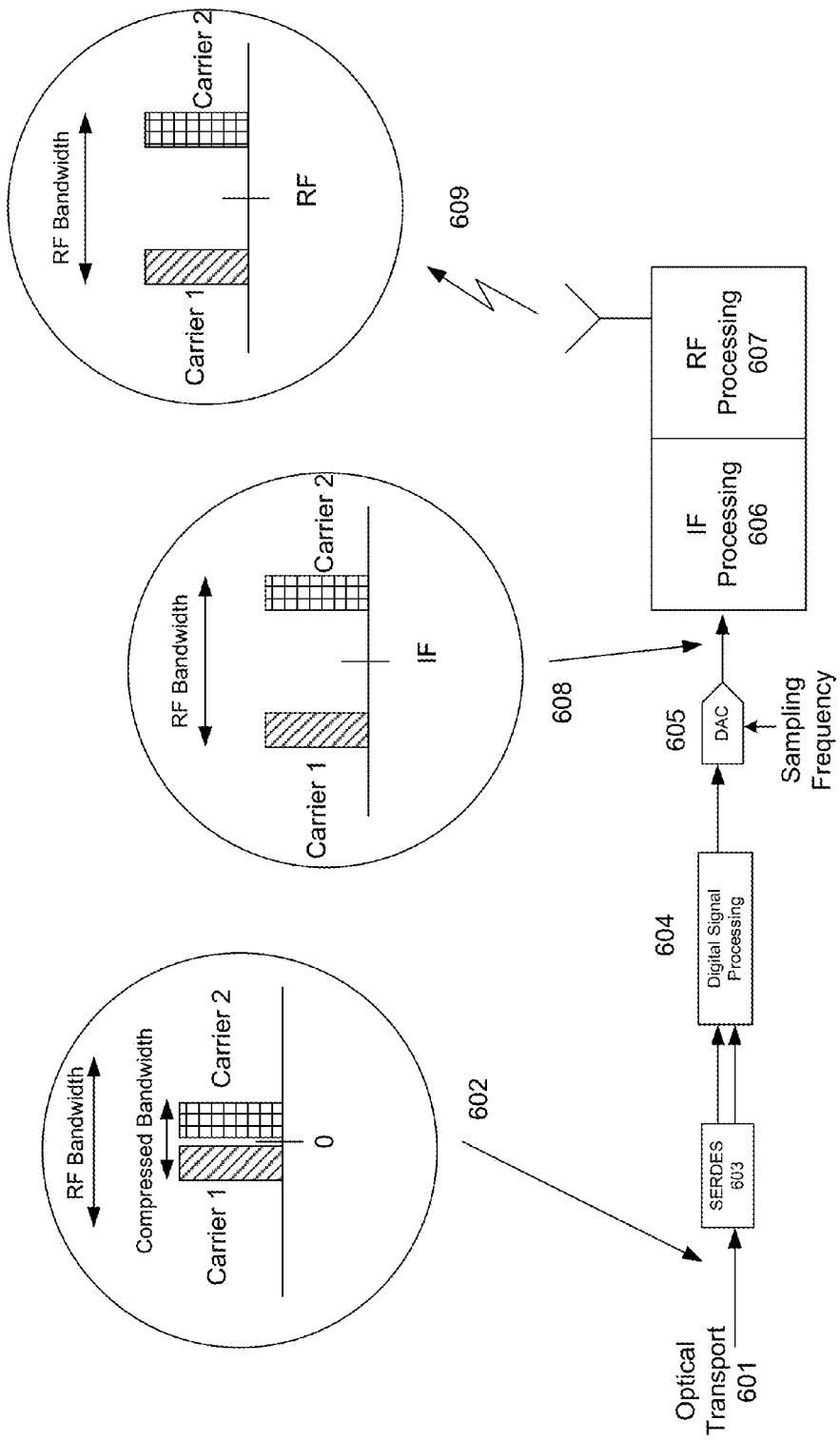
FIG. 6 shows an embodiment illustrating the reconstruction of the downlink signal using the bandwidth decompression technique of the present invention, which is employed within the DRU.

FIG. 6 shows an embodiment illustrating the reconstruction of the downlink signal using the bandwidth decompression. Referring to FIG. 6, the serial bit stream 602 is fed from the Optical Transport function 601 into the Serializer/Deserializer (SERDES) 603 which translates the serial bit stream into parallel bit streams. The parallel bit streams are fed into the Digital Signal Processing function 604 which prepares the signals to be processed by DAC 605, which samples the resulting signal at a rate such that the signals are reconstructed and returned to their appropriate positions in the IF domain (Signal 608) as seen in FIG. 6. The IF Processing function 606 and the RF Processing function 607 translate the IF signal back to the RF domain, and the resulting RF signal 609 is transmitted from the DRU.

Figure 7:
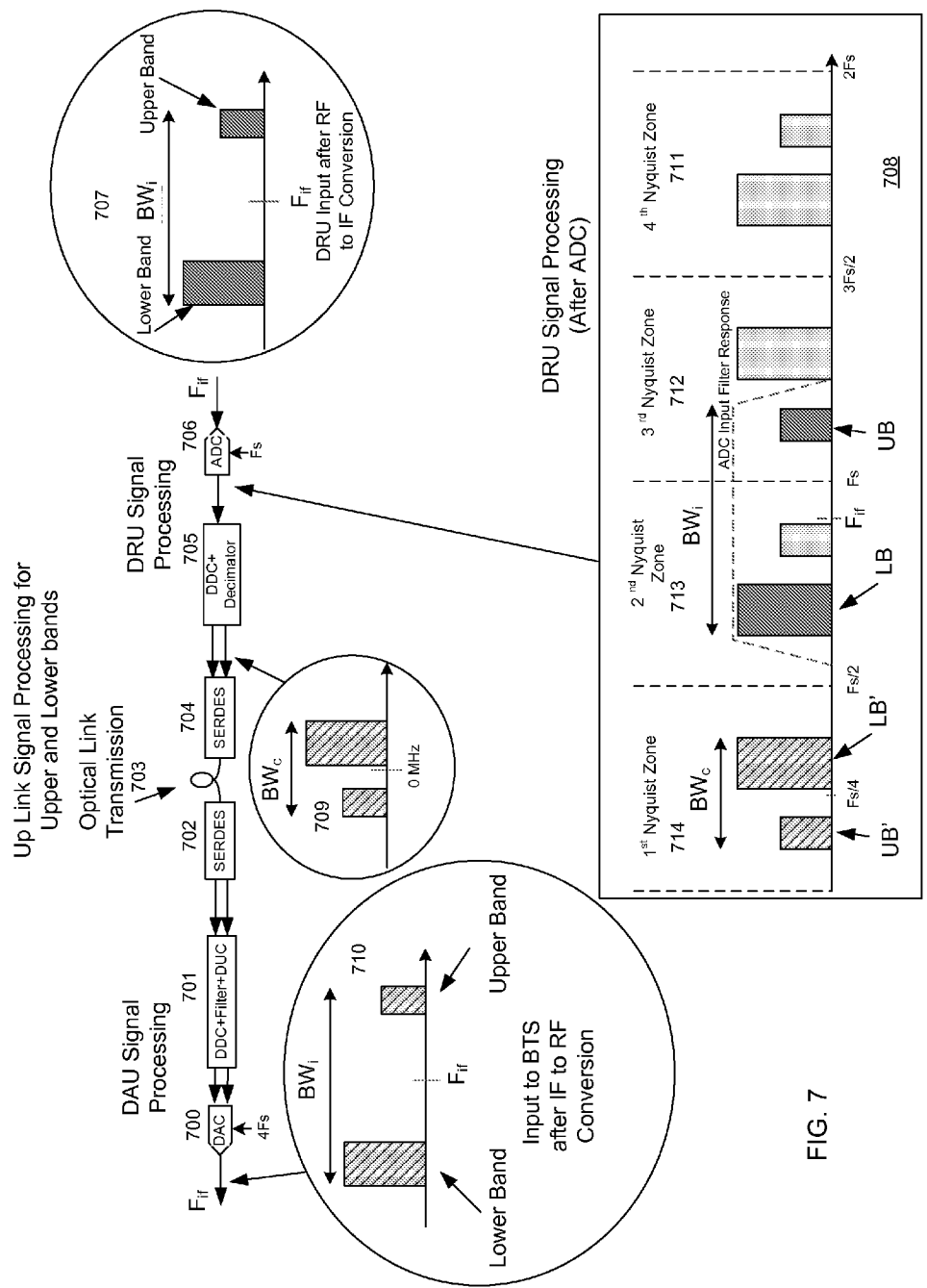
FIG. 7 is a simplified schematic diagram illustrating a system including bandwidth compression techniques provided by an embodiment of the present invention for an uplink signal comprising two wireless carriers with wide frequency spacing.

FIG. 7 illustrates an embodiment wherein the bandwidth compression technique of the present invention may be employed for an uplink signal comprising two wireless carriers with wide frequency spacing $BW_i$ 707. For illustration, the uplink signal 707 includes a Lower Band and an Upper Band. The uplink wireless signal is received at the DRU and then frequency translated down to a selected Intermediate Frequency (IF) which is referred to as $F_{if}$. The IF signal 707 comprises two carriers in noncontiguous frequency blocks inside the total signal bandwidth. In some cases, without employing embodiments of the invention, the signal will have to be sampled at twice the bandwidth $BW_i$, even though no signal is being transported between the lower and upper bands. Thus, direct processing and transport of this signal without any bandwidth compression through embodiments of the present invention would result in an inefficient utilization of the optical fiber transport data rate. After signal 707 is IF frequency translated, IF signal 707 is then fed into ADC 706.

The inset 708 in FIG. 7, subtitled "DRU Signal Processing (After ADC)," illustrates an exemplary implementation for how embodiments of the present invention compress the received signal having bandwidth, $BW_i$ 707, into a compressed signal having compressed bandwidth $BW_c$ 709. By selecting the ADC sampling rate $F_S$ with respect to the selected IF frequency $F_{if}$ such that the Lower and Upper bands appear in different Nyquist zones, images of the sampled carriers will be folded within the same Nyquist zones. The 1st Nyquist zone 714 is from DC to ½ the sampling rate ($F_{S/2}$). The 2nd Nyquist zone 713 is from ½ the sampling rate ($F_{S/2}$) to the sampling rate ($F_S$). The 3rd Nyquist zone 712 is from the sampling rate ($F_S$) to 3/2 the sampling rate ($3F_{S/2}$). Higher Nyquist zones continue in this same fashion. Exemplary embodiments of the invention involve selecting an appropriate sampling rate $F_S$ such that the Lower band (LB) and Upper band (UB) of $BW_i$ 707 fall into two separate Nyquist zones. Once $F_S$ is selected to satisfy this condition, the translation of the original received signal into an intermediate frequency $F_{if}$ typically is chosen next, where $F_{if}$ is the frequency centered at the bandwidth $BW_i$ 707, appropriately such that $F_{if} > F_S$, and the choice of $F_{if}$ still allows the Upper and Lower bands to fall within separate Nyquist zones based on $F_S$.

Figure 9:
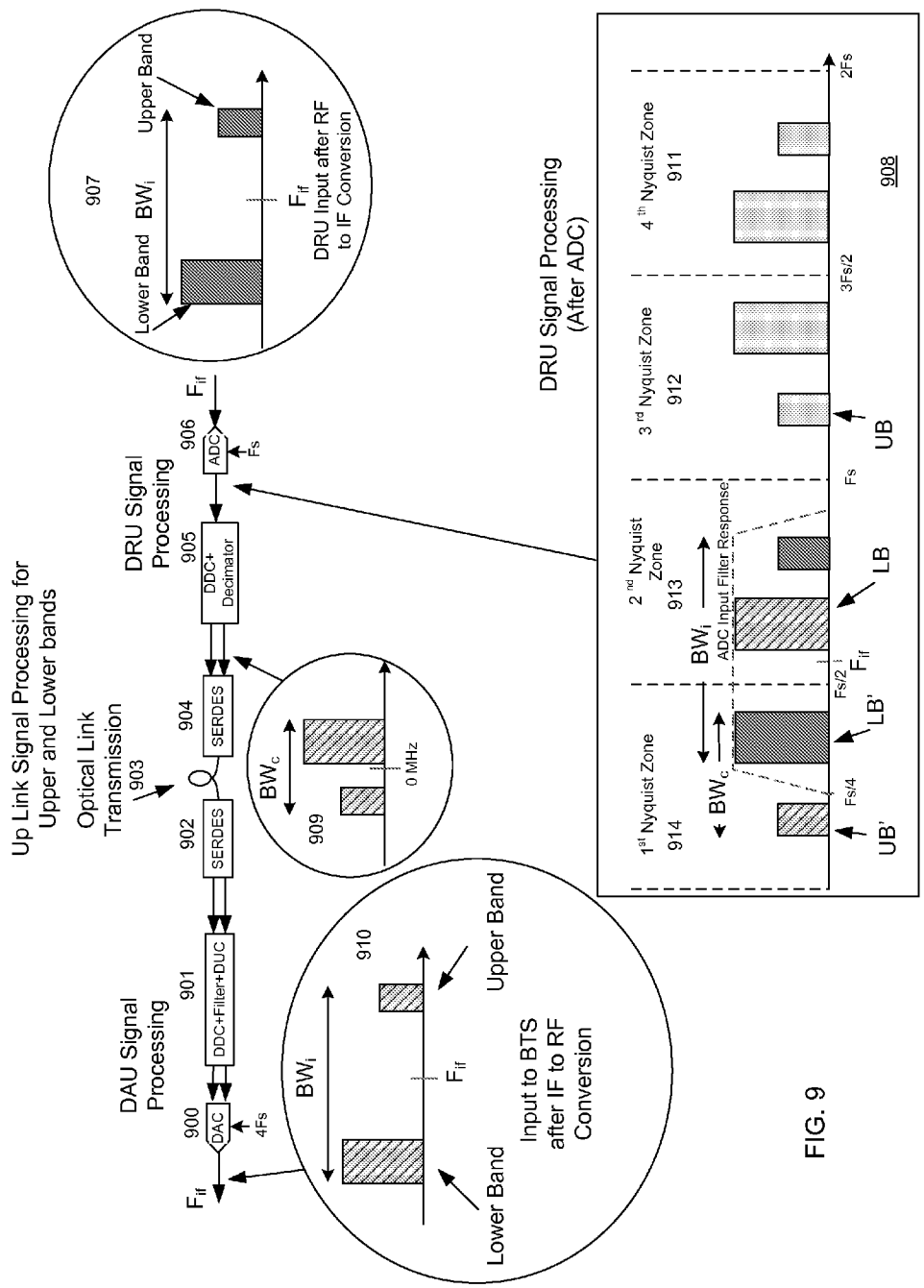
FIG. 9 is a simplified schematic diagram illustrating a system including bandwidth compression techniques provided by an alternative embodiment of the present invention.

In the example shown in FIG. 7, the Lower band (LB) is shown to fall within the $2^{nd}$ Nyquist zone 713, which is designated as the bandwidth between half the sampling rate $F_S$ to the sampling rate $F_S$. Similarly, the Upper band (UB) is shown to fall within the $3^{rd}$ Nyquist zone 712, which is designated as the bandwidth between the sampling rate $F_S$ and 3/2 of the sampling rate $F_S$. The Upper band and Lower band are placed in separate Nyquist zones, such that $F_{if} < F_S$. In other embodiments, the Upper and Lower bands may be reversed; that is, the Upper band may fall within the $2^{nd}$ Nyquist zone while the Lower band falls within the $3^{rd}$ Nyquist zone. In other embodiments, the Upper and Lower bands may be in a different ordered sequence of Nyquist zones, e.g. Upper and Lower bands fall within the $4^{th}$ and $5^{th}$ Nyquist zones, or $1^{st}$ and $2^{nd}$ Nyquist zones, etc. As an example, FIG. 9 provides additional description of alternative embodiments.

The images of the carriers before sampling each appear in different Nyquist zones and through the sampling process of the ADC 706 the images are then folded into the same Nyquist zone in order to result in a compact spectrum for the combined carriers. This folding of carriers into the same Nyquist zone is an inherent bi-product of selecting $F_S$ and $F_{if}$ such that the Upper and Lower bands fall within separate Nyquist zones. The images of each of the Upper and Lower bands are inherently reflected into the other multiple Nyquist zones (e.g. UB' and LB', respectively), as shown in the inset 708 of FIG. 7, resulting in both Upper and Lower bands appearing in the same Nyquist zone, e.g. the $1^{st}$ Nyquist zone 714 and the $4^{th}$ Nyquist zone 711, but at compressed bandwidths $BW_c$.

Thus, in certain embodiments of the invention, the choice of sampling rate $F_S$ with respect to IF frequency $F_{if}$ is made so that the carriers are closely spaced and yet can easily be reconstructed so that they are repositioned at the original frequency spacing without a high complexity of digital signal processing. In some embodiments, $F_S$ and $F_{if}$ are selected with an added condition that the resulting compressed signal does not place both Upper and Lower bands so close together that it becomes difficult to filter the two signals and also reconstruct the original signal. In some embodiments, the particular choice of sampling rate $F_S$ and IF frequency $F_{if}$ may depend on the bandwidth of the signals to be compressed and should be selected based on employing practical filtering to reconstruct the signals with their original frequency spacing. The selection of the most appropriate Nyquist zone to use in processing the carriers' images is driven by the fact that the signal-to-noise ratio is degraded at the higher Nyquist zones. Namely, exemplary embodiments select the $1^{st}$ Nyquist zone 714 to process the compressed signal having bandwidth $BW_c$, because the $1^{st}$ Nyquist zone 714 has a better signal-to-noise ratio than the higher Nyquist zones.

The resulting signal 708 comprising the compressed bandwidth carriers is then further translated in the Digital Down Converter (DDC) and decimator 705 so that the resultant signal 709 is at baseband and is formatted as parallel bit streams. This means that typically, the signals falling within the higher Nyquist zones, e.g. $2^{nd}$ Nyquist zone 713, $3^{rd}$ Nyquist zone 712, $4^{th}$ Nyquist zone 711, etc., are filtered out, such that only the compressed signal 708 remains. Notice that while the original signal placed in the $2^{nd}$ and $3^{rd}$ Nyquist zones are filtered out, no information is lost with respect to the original signal, since both Upper and Lower bands are inherently replicated into the $1^{st}$ Nyquist zone 714.

Alternative embodiments of the present invention may switch the order of whether $F_S$ or $F_{if}$ is chosen first, relative to the other parameter and subject to the above mentioned constraints. In other embodiments, $F_S$ or $F_{if}$ may be fixed, while the other parameter is chosen relative to the fixed parameter and subject to the above mentioned constraints.

As will be discussed below, the translation to baseband in the DRU is not necessarily limited to employing a Digital Down Converter (DDC) and decimator. Other embodiments may involve different filtering means that would be readily apparent to those with skill in the art. The baseband signal has a compressed bandwidth $BW_c$ 709, which means that a lower data rate can be employed to preserve all the information contained in the two carriers, which is a key advantage of embodiments of the present invention. The baseband signal 709 is then delivered to the SERDES 704 for transport over the optical fiber 703.

The optical data at the end of the optical link 703 is then delivered to the SERDES 702 in the DAU. At the DAU the signal output from the SERDES is then Digitally Up Converted (DUC), Filtered and then Digitally Downconverted (DDC), in 701, so as to reconstruct the original signal at digital IF. The reconstruction at the DAU from the baseband signal to an IF signal is not limited to DUC-Filter-DDC processes. The carriers received from SERDES 702 are individually filtered and translated to the original frequency spacing as in 707.

The reconstructed digital IF signal is then fed into the Digital to Analog Converter (DAC) 700 and the DAC output will be an analog IF signal 710 with the same carrier spacing as the DRU input IF signal 707.

As mentioned previously with regard to FIG. 7, the translation to baseband in the DRU is not necessarily limited to employing a Digital Down Converter (DDC) and decimator. An alternative embodiment would employ independently processing the individual carriers and combining them at baseband.

An alternative method for processing the uplink signal in the DRU to compress the bandwidth would be as follows. A quadrature modulator can be utilized for translating the IF signal 707 directly to baseband using in-phase and quadrature (I and Q) representations of the uplink signals, which are then fed into dual ADCs. The respective outputs of the ADCs are then digitally processed so as to compress the overall bandwidth of the combined signals. Frequency translation of the individual carriers followed by filtering can be used to result in a bandwidth-compressed signal as in 709.

An alternative embodiment would be to choose a different IF frequency at the DRU then the one at the DAU. If the sampling rate is common between the DAU and DRU, then the IF frequency at the DRU can be chosen independently form the IF frequency at the DAU. The signal processing at the DRU and DAU will ensure that the signals are translated correctly between units.

An alternative embodiment would be to choose a different Sampling frequency at the DRU then the one at the DAU. If the IF frequency is common between the DAU and DRU, then the Sampling frequency at the DRU can be chosen independently form the Sampling frequency at the DAU. The signal processing at the DRU and DAU will insure that the signals are translated correctly between units.

FIG. 7 depicts the transportation of the Uplink signal from the DRU to the DAU. An analogous process is used to transport the downlink signal from the DAU to the DRU. A difference is that signal 707 will appear at the input to the DAU and signal 710 will appear at the output from the DRU.

Advantages of embodiments of the present invention may include more efficient implementation of wireless communications systems. For example, for a given cell phone of a user, there may be a number of bands at which the cell phone operates. The cell phone may operate at varying megahertz frequencies, e.g. 1900 MHz, 850 MHz and 700 MHz. A cell phone provider, e.g. Verizon® or AT&T®, may need to be able to handle all these bands in order to cover all modes of communication of the cell phone. However, for example, in the 700 MHz band Verizon® and AT&T® own spectrum, the spectrums are actually quite aways apart, e.g. about 150 MHz between each spectrum of Verizon® and AT&T®. With embodiments of the present invention, implementations use only four bands, whereas conventional products would utilize five bands. Thus, whereas a conventional product may have to utilize a separate band for a first operator and a separate band for a second operator, the bandwidth compression techniques described herein can combine the traffic from the multiple operators into a single band.

Figure 8:
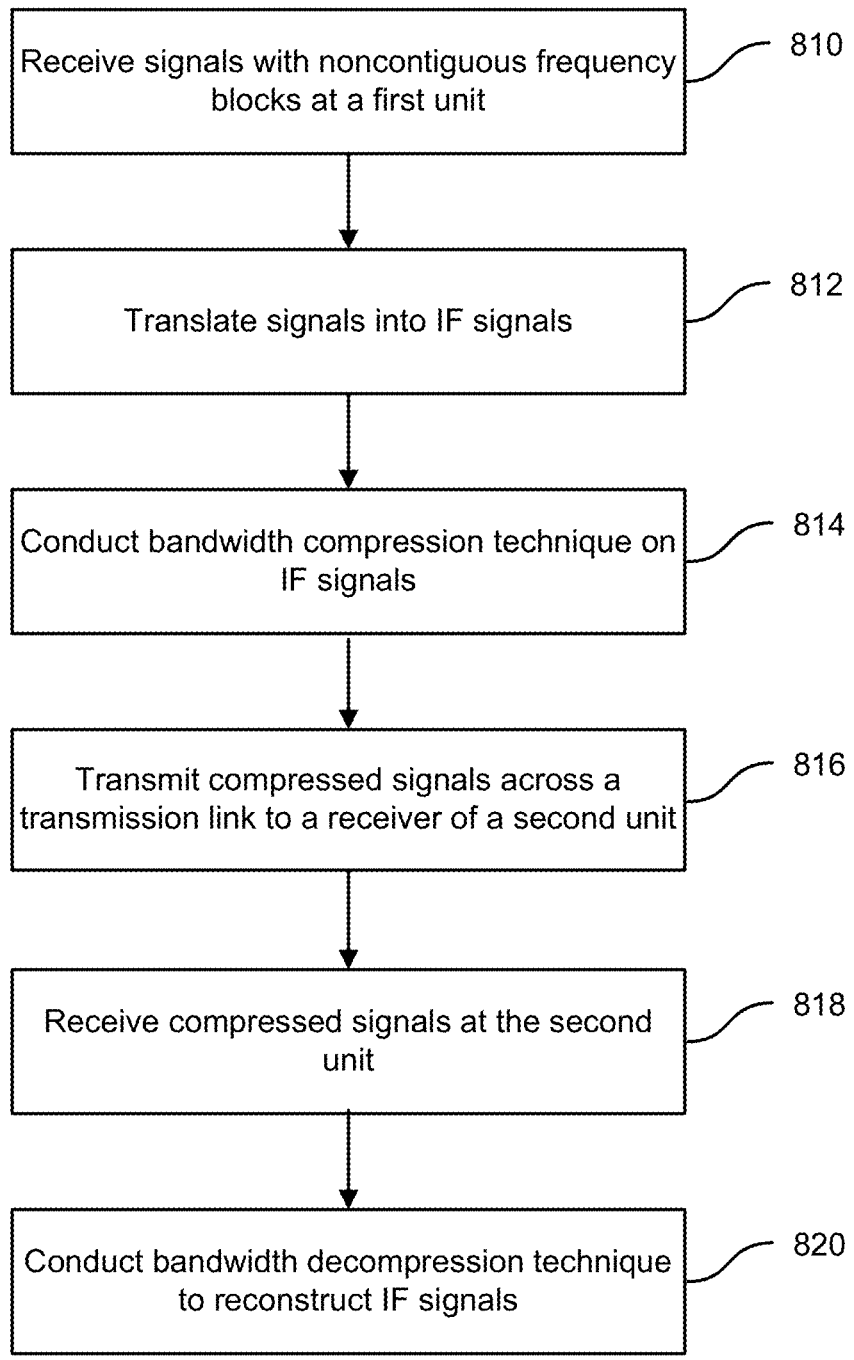
FIG. 8 is a simplified flowchart illustrating a method of transmitting communications signals according to an embodiment of the present invention.

FIG. 8 is a simplified flowchart illustrating a method of transporting communications signals according to an embodiment of the present invention. The exemplary method starts at block 810, wherein a first unit, e.g. a DRU, may receive signals with noncontinguous frequency blocks, e.g. two carriers, a lower band and an upper band, spanning total bandwidth $BW_t$ between them. The signals may be analog or digital signals. The signals may be then translated into intermediate frequency (IF) signals, as shown in block 812. Translating the original signals into IF signals enables embodiments of the present invention to more easily manipulate the signals using signal processing devices known in the art.

The method continues to block 814, where signal compression techniques of the present invention may compress the bandwidth $BW_t$ between the lower band and upper bands into a compressed bandwidth $BW_c$. Exemplary compression techniques of the present invention are described in FIG. 7, above. Block 814 may include other signal processing techniques, for example the use of an ADC module if the original signals were analog signals.

In some embodiments, in between blocks 814 and 816, the signals processed through the compression technique may also be filtered, such that only the compressed signals remain. This may be done through various means, such as a DDC and a decimator, or other filtering means that would be apparent to those with skill in the art. The compressed signals may then be converted into their in-phase (I) and quadrature-phase (Q) components, and may also be down-converted. The I and Q components of the compressed signals may then be processed through a Serializer/Deserializer (SERDES), in anticipation of being transmitted through a transmission link.

At block 816, the compressed signals may then be transmitted across a transmission link to a receiver of a second unit. The transmission link may be an optical link transmission, Ethernet cable, Microwave Link, coaxial connection, Wireless link, or other transmission means for carrying a signal to a second unit. The second unit may be a DAU, or in other embodiments may be the base station itself.

At block 818, the second unit, e.g. DAU, receives the compressed signals via the transmission link. If the signals were converted into their I and Q components, and/or were processed through a SERDES, then the compressed signals would need to be inverse-processed using another SERDES, digital down-converter (DDC), digital up-converter (DUC), various filters or other means known in the art.

Finally, at block 820, reconstruction techniques are employed that reverse the bandwidth compression of the IF signals, wherein none of the information of the original signals is lost. The signals may pass through a DAC if the original signals were analog signals, and be utilized by the second unit or passed on to another unit, e.g. a base station, for information processing or the like. It is apparent by this method that embodiments of the present invention may be viewed as "symmetric," in that the processing conducted on either end of the methods described a reversed with no loss of information. Therefore, it is apparent that the techniques described herein can be reversed, in that the same bandwidth compression and decompression techniques can be employed starting from the second unit, e.g. the DAU or base station, and ending at the first unit, e.g. the DRU. These techniques may be consistent with those described in any and all of FIGS. 1 through 7.

It should be appreciated that the specific steps illustrated in FIG. 8 provide a particular method of transporting communications signals according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple substeps that may be performed in various sequences as appropriate to the individual step. Furthermore, additional steps may be added or removed depending on the particular applications. One of ordinary skill in the art would recognize many variations, modifications, and alternatives.

FIG. 9 illustrates an alternative embodiment wherein the bandwidth compression technique of the present invention may be employed for an uplink signal comprising two wireless carriers with wide frequency spacing $BW_i$ 907. The uplink signal 907 includes a Lower Band and a Upper Band. The uplink wireless signal is received at the DRU and then frequency translated down to a selected Intermediate Frequency (IF) which is referred to as $F_{if}$. The IF signal 907 comprises two carriers in noncontiguous frequency blocks inside the total signal bandwidth. Direct processing and transport of this signal without any bandwidth compression would result in an inefficient utilization of the optical fiber transport data rate. IF signal 907 is fed into ADC 906. For this embodiment the first carrier is positioned inside the $1^{st}$ Nyquist zone and the second carrier is positioned inside the $2^{nd}$ Nyquist zone. The image of the second carrier (i.e., upper band) is positioned in the $1^{st}$ Nyquist zone within the bandwidth $BW_c$ of the first carrier (i.e., the lower band). Thus, this alternative embodiment differs from the embodiment illustrated in FIG. 7, in which the $1^{st}$ Nyquist zone included images of both carriers.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for transporting communications signals, the method comprising:
   receiving an analog IF signal at a first unit, wherein the analog IF signal includes a first carrier having a first frequency and a first bandwidth and a second carrier having a second frequency different from the first frequency and a second bandwidth;
   providing a sampling signal having a sampling frequency;
   converting the analog IF signal to a digitally sampled IF signal having:
      the first carrier located in a first Nyquist zone;
      the second carrier located in a second Nyquist zone;
      an image of the first carrier located in a third Nyquist zone; and
      an image of the second carrier located in the third Nyquist zone;
   transmitting the image of the first carrier and the image of the second carrier from the first unit to a second unit;
   receiving the image of the first carrier and the image of the second carrier at the second unit;
   providing a second sampling signal have a second sampling frequency; and
   converting the image of the first carrier and the image of the second carrier to the analog IF signal.

2. The method of claim 1 wherein the first unit comprises a DRU and the second unit comprises a DAU.

3. The method of claim 1 wherein the first unit comprises a DAU and the second unit comprises a DRU.

4. The method of claim 1 wherein the third Nyquist zone is centered at a frequency lower than a center of the first Nyquist zone and a center of the second Nyquist zone.

5. The method of claim 1 further comprising filtering the digitally sampled IF signal.

6. The method of claim 1 wherein transmitting the image from the first unit to a second unit is performing using an Ethernet cable, an optical cable, a microwave link, a coaxial connection, or a wireless link.

7. The method of claim 1 wherein transmitting the image from the first unit to a second unit is via a parallel connector independent of a SERDES.

8. A system for transporting communications signals, the system comprising:
   a first unit having:
      an input port operable to receive an analog IF signal including a first carrier having a first frequency and a first bandwidth and a second carrier having a second frequency different from the first frequency and a second bandwidth;
      an A/D converter coupled to the input port and operable to convert the analog IF signal into a digitally sampled IF signal wherein:
         the first carrier is located in a first Nyquist zone;
         the second carrier is located in a second Nyquist zone;
         an image of the first carrier is located in a third Nyquist zone; and
         an image of the second carrier is located in the third Nyquist zone;
   a second unit including a D/A converter operable to convert the image of the first carrier and the image of the second carrier into the analog IF signal; and a transmission link coupling the first unit and the second unit, wherein the transmission link is operable to transmit the image of the first carrier and the image of the second carrier from the first unit to the second unit.

9. The system of claim 8 wherein the first unit comprises a DRU and the second unit comprises a DAU.

10. The system of claim 8 wherein the first unit comprises a DAU and the second unit comprises a DRU.

11. The system of claim 8 further comprising a daisy chain of DRUs, wherein each DRU of the daisy chain comprises an input port and an A/D converter.

12. The system of claim 8 further comprising a daisy chain of DAUs, wherein each DAU of the daisy chain comprises an input port and an A/D converter.

13. The system of claim 8 wherein the first unit further comprises a filter coupled to the A/D converter and operable to filter out the first Nyquist zone and the second Nyquist zone.

14. The system of claim 8 wherein the transmission link comprises an Ethernet cable, an optical cable, a microwave link, a coaxial connection, or a wireless link.

\* \* \* \* \*